United States Patent
Michiels et al.

(10) Patent No.: US 10,630,462 B2
(45) Date of Patent: Apr. 21, 2020

(54) USING WHITE-BOX IN A LEAKAGE-RESILIENT PRIMITIVE

(71) Applicant: NXP B.V., Eindhoven (NL)

(72) Inventors: Wilhelmus Petrus Adrianus Johannus Michiels, Reusel (NE); Marcel Medwed, Graz (AT); Jan Hoogerbrugge, Helmond (NE); Ventzislav Nikov, Haasrode (BE); Bruce Murray, Hamburg (DE); Joppe Willem Bos, Wijgmaal (BE)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 15/795,890

(22) Filed: Oct. 27, 2017

(65) Prior Publication Data
US 2019/0132116 A1    May 2, 2019

(51) Int. Cl.
*H04L 29/06*  (2006.01)
*H04L 9/06*   (2006.01)
(Continued)

(52) U.S. Cl.
CPC ........... *H04L 9/0631* (2013.01); *H04L 9/003* (2013.01); *H04L 9/0662* (2013.01); *H04L 9/14* (2013.01); *H04L 2209/16* (2013.01)

(58) Field of Classification Search
CPC ................................. H04L 9/00; G06F 21/00
See application file for complete search history.

(56) References Cited

U.S. PATENT DOCUMENTS 9,363,244 B2    6/2016  Michiels et al.
2007/0086586 A1  4/2007  Jakubowski et al.
(Continued)

OTHER PUBLICATIONS

Bos et al., Differential Computation Analysis: Hiding Your White-Box Designs is not enough. Cryptology ePrint Archive, Report 2015/753, 2015.
(Continued)

*Primary Examiner* — Joseph P Hirl
*Assistant Examiner* — Leynna Truvan

(57) ABSTRACT

A method for implementing a pseudo-random function (PRF) using a white-box implementation of a cryptographic function in N rounds, including: receiving an input to the PRF; receiving a cryptographic key in a first round; encrypting, using the white-box implementation of the cryptographic function and the cryptographic key, an input message that is one of M possible input messages based upon a portion of the input to produce a first output; for each succeeding round: encrypting, using the white-box implementation of the cryptographic function and an $i^{th}$ cryptographic key, further input messages that are one of M possible input messages based upon a further portion of the input to produce an $i^{th}$ output, wherein the $i^{th}$ cryptographic key is the output from the preceding round, wherein the white-box implementation of the cryptographic function only produces a correct output for the M possible input messages and produces an incorrect output for input messages that are not one of the M possible input messages.

15 Claims, 5 Drawing Sheets

(51) Int. Cl.
  *H04L 9/00*   (2006.01)
  *H04L 9/14*   (2006.01)

(56) References Cited

U.S. PATENT DOCUMENTS

2014/0229744 A1\*  8/2014  Doumen ............... G06F 21/121
                                                     713/190
2016/0323097 A1   11/2016  Medwed et al.

OTHER PUBLICATIONS

Chow et al., A White-Box DES Implementation for DRM Applications, Proceedings of the 2nd ACM Workshop on Digital Rights Management, 1015, 2002.
Chow et al., White-Box Cryptography and an AES Implementation Proceedings of the 9th Annual Workshop on Selected Areas in Cryptography, 250-270, 2002.
Goldreich et al., How to Construct Random Functions, Journal of the ACM, 33(4) 792-807, 1986.
Harder et al., Syncrosoft MCFACT, Secure Data Processing Technology, Re-trust Sixth Quarterly Meeting, Mar. 11, 2008, Vilach, Austria.
Medwed et al., Unknown-Input Attacks in the Parallel Setting: Improving the security of the CHES 2012 Leakage-Resilient PRF. Proc. of the ASIACRYPT 2016: 22nd Int'l. Conf.

\* cited by examiner

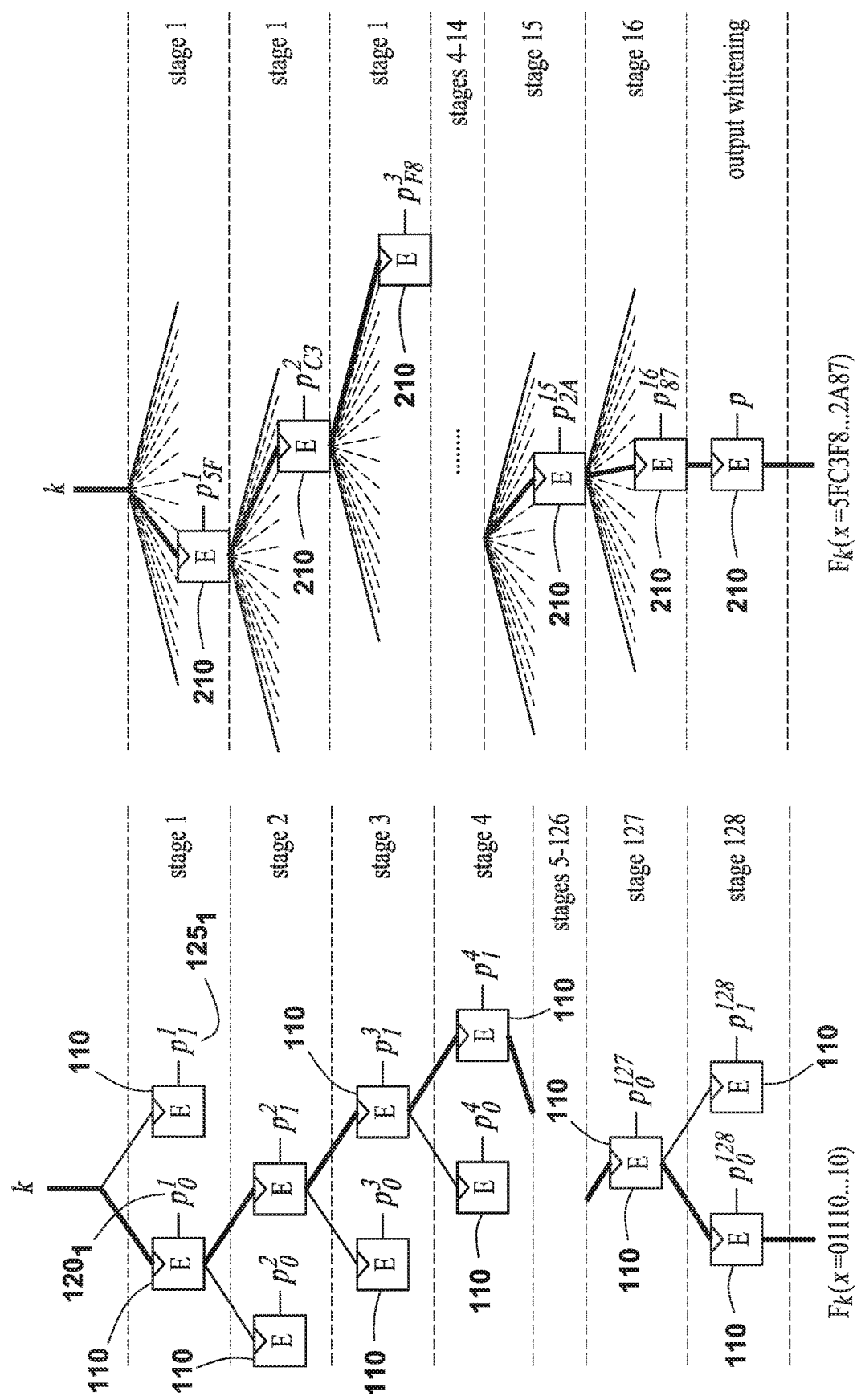

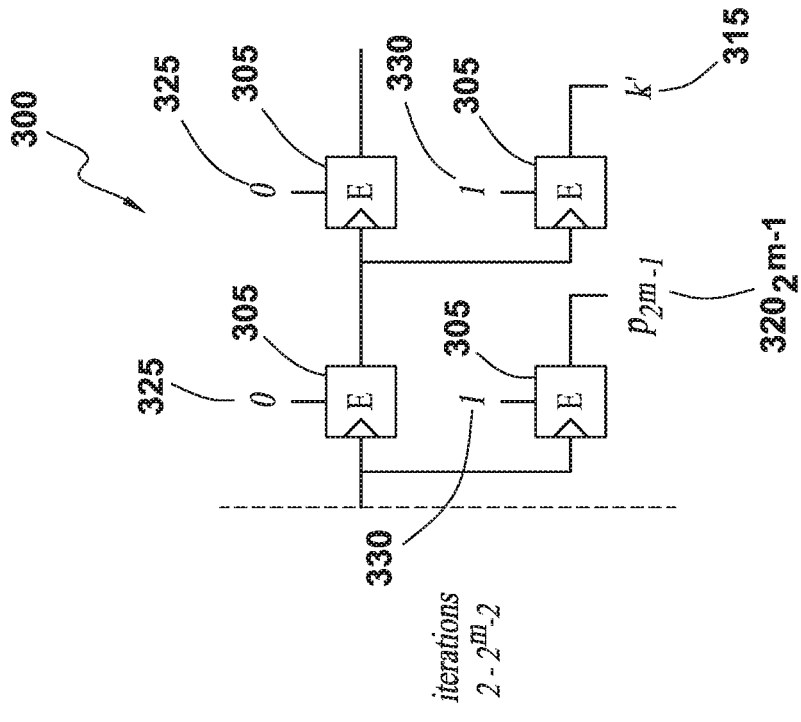
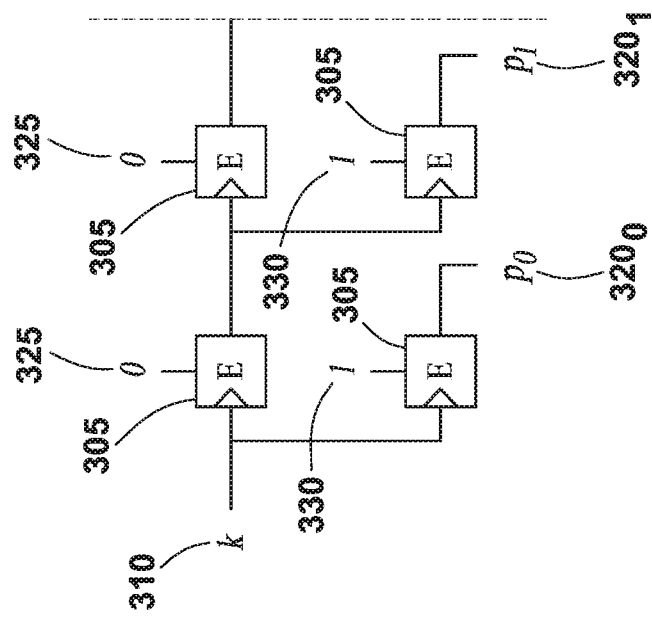
FIG. 3

US 10,630,462 B2

USING WHITE-BOX IN A LEAKAGE-RESILIENT PRIMITIVE

TECHNICAL FIELD

Various exemplary embodiments disclosed herein relate generally to using a white-box implementation in a leakage-resilient primitive.

BACKGROUND

The widespread use of secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for implementing a pseudo-random function (PRF) using a white-box implementation of a cryptographic function in N rounds, including: receiving an input to the PRF; receiving a cryptographic key in a first round; encrypting, using the white-box implementation of the cryptographic function and the cryptographic key, an input message that is one of M possible input messages based upon a portion of the input to produce a first output; for each succeeding round: encrypting, using the white-box implementation of the cryptographic function and an $i^{th}$ cryptographic key, further input messages that are one of M possible input messages based upon a further portion of the input to produce an $i^{th}$ output, wherein the $i^{th}$ cryptographic key is the output from the preceding round, wherein the white-box implementation of the cryptographic function only produces a correct output for the M possible input messages and produces an incorrect output for input messages that are not one of the M possible input messages.

Further various embodiments relate to a non-transitory machine-readable storage medium encoded with instructions implementing a pseudo-random function (PRF) using a white-box implementation of a cryptographic function in N rounds, including: instructions for receiving an input to the PRF; instructions for receiving a cryptographic key in a first round; instructions for encrypting, using the white-box implementation of the cryptographic function and the cryptographic key, an input message that is one of M possible input messages based upon a portion of the input to produce a first output; for each succeeding round: instructions for encrypting, using the white-box implementation of the cryptographic function and an $i^{th}$ cryptographic key, further input messages that are one of M possible input messages based upon a further portion of the input to produce an $i^{th}$ output, wherein the $i^{th}$ cryptographic key is the output from the preceding round, wherein the white-box implementation of the cryptographic function only produces a correct output for the M possible input messages and produces an incorrect output for input messages that are not one of the M possible input messages.

Further various embodiments relate to a pseudo-random function (PRF) device using a white-box implementation of a cryptographic function in N rounds, including: a memory; and a processor in communication with the memory, the processor configured to: receive an input to the PRF; receive a cryptographic key in a first round; encrypt, using the white-box implementation of the cryptographic function and the cryptographic key, an input message that is one of M possible input messages based upon a portion of the input to produce a first output; for each succeeding round: encrypt, using the white-box implementation of the cryptographic function and an $i^{th}$ cryptographic key, further input messages that are one of M possible input messages based upon a further portion of the input to produce an $i^{th}$ output, wherein the $i^{th}$ cryptographic key is the output from the preceding round, wherein the white-box implementation of the cryptographic function only produces a correct output for the M possible input messages and produces an incorrect output for input messages that are not one of the M possible input messages Various embodiments are described, wherein the cryptographic function is AES.

Various embodiments are described, wherein the white-box implementation of the cryptographic function uses substitution boxes (S-boxes) and wherein entries of the S-boxes associated with input messages that are not one of the M possible input messages are replaced with an incorrect value.

Various embodiments are described, wherein the incorrect output of the white-box implementation of the cryptographic function is no output for input messages that are not one of the M possible input messages.

Various embodiments are described, wherein the white-box implementation of the cryptographic function uses substitution boxes (S-boxes) and wherein entries of the S-boxes associated with input messages that are not one of the M possible input messages are removed from the S-box.

BRIEF DESCRIPTION OF THE DRAWINGS

In order to better understand various exemplary embodiments, reference is made to the accompanying drawings, wherein:

FIG. 1 illustrates a chain of encryptions to implement a PRF;

FIG. 2 illustrates an embodiment where the number of plaintexts per encryption may be increased in order to decrease the number of iterations;

FIG. 3 depicts such a first layer of a two layer approach for implementing the PRF;

To facilitate understanding, identical reference numerals have been used to designate elements having substantially the same or similar structure and/or substantially the same or similar function.

DETAILED DESCRIPTION

Figure 4:
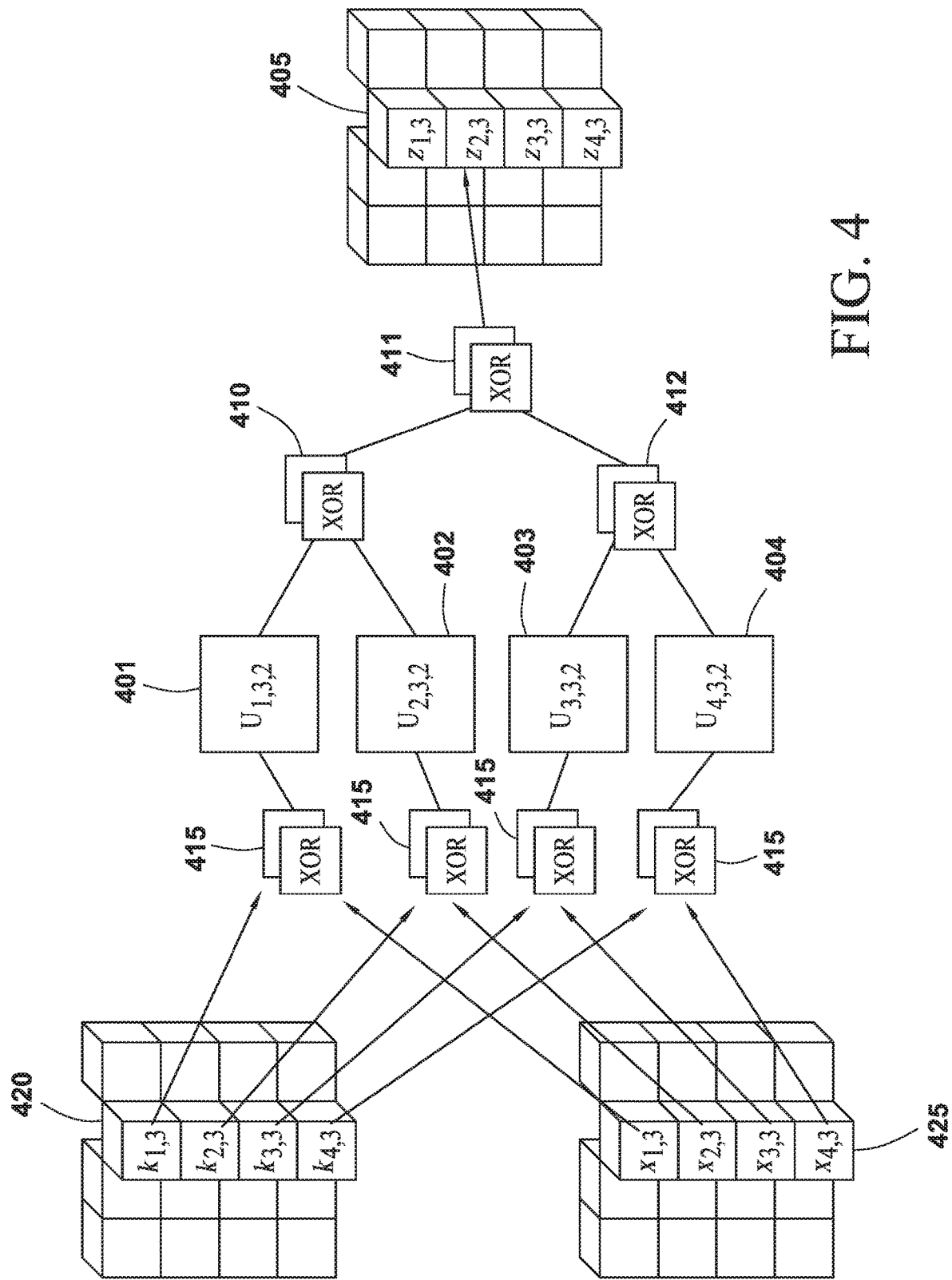
FIG. 4 illustrates a look-up table implementation of computing an output byte of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Cryptographic algorithms, like AES and DES, are designed in order to be secure in a black-box attack model. This means that the attacker is assumed to have at most access to the input and output of the algorithm. This attack model is not very realistic in case the attacker has access to the devices implementing the cryptographic algorithm. The attacker can for instance steal the device, access it remotely over the Internet, or seduce the device owner to install malicious software on it. It may even be the case that the owner of the device is the attacker, such as in many DRM applications. In such cases, the attacker can try to attack the implementation of the cryptographic implementation. In the grey-box attack model, we assume the attacker to have only limited access to this implementation. That is, he can observe side-channel information, such as power consumption and timing, and he may be able to introduce some errors in the computation. This attack model is for instance a realistic one for smart-cards.

An even stronger attack model is the white-box model. Here, the attacker is assumed to have full access to and full control over the implementation. The attacker can, for instance, observe intermediate results and change them at will. The white-box attack model is a realistic one if the algorithm is implemented in software running on an open application processor. An example is a payment app running on a mobile phone using Host Card Emulation (HCE). We refer to a white-box implementation as a software implementation of a cryptographic algorithm that aims at hiding the key from a white-box attacker.

It is known that a powerful method for extracting a key in a grey-box scenario is to collect power consumption information for multiple executions of the algorithm and to perform an analysis on them. Examples of such attacks are Differential Power Analysis (DPA) and Correlation Power Analysis (CPA). Such attacks may be protected against by hardening the implementation via, for instance, masking and adding noise. Alternatively, the leaking implementation may be used in a way that an attacker can never collect sufficient traces to successfully mount the attacks. This approach is taken in the pseudo-random function (PRF) defined by Goldreich, Goldwasser and Micali. In this approach, a chain of encryptions, where each encryption can only have two possible plaintexts as input are implemented. FIG. 1 illustrates a chain of encryptions to implement a PRF. More precisely, they define a pseudo-random function $F_k(x)$ indexed by key k and evaluated on n-bit number x as follows. The input x is split into n bits and for each i with i=1,2, . . . , n we define 2 plaintexts $p_0^i$ and $p_1^i$. The PRF includes n iterations. In the first iteration an encryption algorithm E 110 is applied, such as AES, with key k and with plain text $p_0^1$ 120$_1$ or $p_1^1$ 125$_1$, depending on whether the first bit in x is 0 or 1. In iterations i>1, E is again applied, but the key 115 is now given by the cipher text computed in iteration i−1. The plaintext is again selected from $p_0^i$ 120$_i$ or $p_1^i$ 125$_i$ depending on whether bit i of x equals 0 or 1. The outcome of the nth iteration is defined as the outcome of $F_k(x)$.

It has been shown that the analysis techniques used in differential power analysis (DPA) and chosen plaintext analysis (CPA) to extract the key from power traces are also very effective for extracting keys from white-box implementations. Here, they do not use the power traces of an execution, but traces containing precise, noiseless information on the execution of the algorithm. This information can be intermediate values, stack values, or addresses accessed during execution. As for DPA and CPA, a designer can also try to harden a white-box implementation against such attacks. However, these attacks may also be counted at a protocol level, as depicted in FIG. 1. Embodiments disclosed herein describe how this can be done.

It is noted that a straightforward application of the approach of FIG. 1 does not work in the white-box context. That is, an implementation resistant to the DCA attacks previously disclosed do no result by just replacing all encryptions in FIG. 1 by white-box implementations. The reason is that, while in a grey-box environment the encryption algorithm is only applied to valid inputs, in a white-box environment an attacker is able to feed the encryption algorithm with any input, including invalid ones. In this way, the attacker is still able to collect sufficient traces to mount a successful attack.

A powerful method for attacking white-box implementations is to analyze a collection of computational traces, where a computational trace contains information that a white-box attacker can extract from an execution. Examples are intermediate values, stack values, or memory addresses. The embodiments disclosed herein describe an approach for dealing with such kind of attacks.

To protect against DCA-like attacks, the white-box implementation in a leakage-resilient construction may be used in which the implementation is only run on a very limited number of inputs. An example of such a construction is given in FIG. 1. However, if such a method is implemented straightforwardly, then this does not provide sufficient security. Although for proper usage, the property holds that for a given starting key k, the white-box is only applied to a limited number of selected inputs, a white-box attacker can change this selection in order to obtain sufficient different computation traces to successfully mount an attack.

To solve this issue, the embodiments described herein use in each iteration i, a white-box implementation $WB_i$ of the block cipher E that, instead of for the complete domain $GF(2^n)$, only computes a correct outcome for plaintexts in a subset $V_i \subseteq GF(2^n)$, where:

- $V_i$ contains at least the selected subset $P_i$ of plaintexts that can be given as input to the white-box implementation. For the PRF of FIG. 1, this means $P_i = \{p_0{}^i, p_1{}^i\} \subseteq V_i$.
- $V_i$ is small—preferably, $|P_i|=|V_i|$. If $|P_i|<|V_i|$, then preferably, subset $V_i - P_i$ is such that it is not easy for an attacker to guess its members. Note that any member from $V_i$ gives a candidate computational trace for a DCA-like attack.
- If a plaintext is outside $V_i$, the white-box implementation either returns an incorrect value, or it does not compute a value at all. In the latter case, it is particularly preferred that $|V_i|$ is close to $|P_i|$ because the attacker can then easily check whether he has a member of $V_i$ that he can use for obtaining a computational trace.

Instead of having a white-box implementation in each iteration, the use of white-box implementations may be restricted to a subset of the iterations. However, at least the first iteration should use a white-box implementation. After the first iteration, the white-box implementations should be such that they enable keys to be changed. This can, for instance, be done by merging the white-box implementation with a white-box implementation of the key scheduling algorithm.

In a related invention U.S. Pat. No. 9,363,244 to Michiels et al., which is hereby incorporated by reference for all purposes as if fully incorporated herein, it was also proposed to provide a user with a white-box implementation that works only correctly on a subset of the message space. However, there it was used in an isolated white-box implementation to realize multiple authorization rights (who can access what) with a single key. Here, it is used in a chain of white-box implementations that, together, form a leakage resilient PRF. Embodiments of U.S. Pat. No. 9,363,244 will not automatically be DCA-resistant because the message space that a user can encrypt/decrypt contains typically sufficient messages to mount a DCA attack if no other countermeasures are in place.

Several variations have been proposed for the structure of FIG. 1. For instance, FIG. 2 illustrates an embodiment where the number of plaintexts per encryption may be increased in order to decrease the number of iterations. For example, each stage may have 16 different plaintexts that are used with different values of the key from the previous round. It is also possible to have a two layer-approach, where the first layer of encryptions computes plaintexts for the second layer of encryptions. FIG. 3 depicts such a first layer of a two layer approach for implementing the PRF. In FIG. 2, each iteration uses $2^m$ plaintexts and m bits of the message to indicate which of the $2^m$ plaintexts is encrypted in an iteration. Furthermore, the first encryption gets a key as input. Now, FIG. 3 shows a possible algorithm for deriving the $2\hat{}m$ plaintexts (re-used in all iterations) and the key that is used as input in FIG. 2. The approach is as follows. In each iteration, two encryptions 305 are performed—one with plaintext message 0 325 and one with plaintext message 1 330. The two encryptions in the first iteration have the main key k as key. The iterations i>1 uses the output of the encryption with input 0 from iteration i−1 as key for the two encryptions. The plaintexts that are used in the LRP of FIG. 2 are the outputs $320_i$, of the encryptions that have 1 as input message. That is, the encryption with input 1 of iteration i gives the ith plaintext $320_i$. The output k' 315 of the last encryption with input 1 is used as key of the LRP of FIG. 2. Hence, by changing the main key, it remains the case that the encryptions of FIG. 3 operate on only two possible inputs. However, this is no longer true for the encryptions in FIG. 2, because the outputs $320_i$ of FIG. 3 change considerably by changing the main key. This implies that if the embodiment described herein for implementing the LRP is to be applied to this 2-stage-approach, it would only be applied to the first stage (i.e., FIG. 3).

For both variations of FIG. 2 and FIG. 3, the embodiments described herein may be used to produce a DCA-resistant white-box implementation. However, in the variation of FIG. 3, the embodiments described herein are only applied to the encryptions in the first layer.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from a substitution box (S-box), and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

Even if a white-box implementation achieves its goal of hiding the key perfectly, this still leaves an attacker the option to misuse the functionality of the key. For instance, he can lift the white-box implementation out of the containing application and use it outside of its context. This problem was already pointed out by Chow et al. in their first publications on white-box cryptography. To address this issue, they introduced external encodings. This means that instead of implementing a cryptographic algorithm Enc, the white-box implementation implements a function $G \circ Enc \circ F^{-1}$. That is, it assumes an input that is encoded by F and instead of computing the output of Enc directly, it computes this output with an output encoding G put on top of it. The encoding of the input and the decoding of the output is done elsewhere in the program. Hence, lifting the white-box implementation out of its application has little to no value without knowing the encoding function F and G. We note that F and G need not both be present. We can also glue the white-box to the application by using only F or only G.

Now an embodiment for a simplified version of the table-based white-box implementation of Chow et al. will be described. Below, this simplified implementation is discussed in two steps. In the first step, it is demonstrated how AES is implemented as a network of lookup tables, and in the second step 2, this network of look up tables is obfuscated. This white-box implementation may then be used to implement the embodiments described herein.

AES operates on data blocks of 16 bytes. These are written as a 4×4 byte matrix, called the state. A round of AES includes the following operations: AddRoundKey, SubBytes, ShiftRows, and MixColumns. The AddRoundKey XORs a key byte to each S-box input. This may be implemented via two lookup tables that each XOR a nibble of the key byte with the associated nibble of an input byte. The S-box operation S can straightforwardly be implemented by a byte-to-byte lookup table. Let $y_{i,j}$ be the output of an S-box operation. The ShiftRows operations is just an index-renumbering of the $y_{i,j}$'s. For ease of presentation, this operation is omitted here. In the MixColumns step, an output byte $z_{i,j}$ of the round is computed from the four output bytes $y_{1,j}$, $y_{2,j}$, $y_{3,j}$ and $y_{4,j}$ via the algebraic expression $z_{l,j}=\alpha_{l,1} \cdot y_{1,j} \oplus \alpha_{l,2} \cdot y_{2,j} \oplus \alpha_{l,3} \cdot y_{3,j} \oplus \alpha_{l,4} \cdot y_{4,j}$ in $GF(2^8)$ for some constants $\alpha_{l,r}$.

FIG. 4 illustrates a look-up table implementation of computing an output byte of a round of AES. Now define a lookup table for each byte-to-byte function $U_{i,j,l}(x)=\alpha_{l,i} \cdot S_{i,j}(x)$ with i,j,l=1,2, . . . , 16 401, 402, 403, 404, where the input is an XOR 415 of the bytes of the key k 420 and bytes of the input x 425. Then any output byte $z_{l,j}$ 405 may be computed by XORing 410, 411, 412 the results of these lookup tables, i.e., $z_{l,j}=U_{1,j,l}(x_{1,j} \oplus k_{1,j}) \oplus U_{2,j,l}(x_{2,j} \oplus k_{2,j}) \oplus U_{3,j,l}(x_{3,j} \oplus k_{3,j}) \oplus U_{4,j,l}(x_{4,j} \oplus k_{4,j})$. Note that the index i,j,l of U may be interpreted as "the contribution of input byte i,j of a round to output byte l,j of the round". These byte-XORs 410, 411, 412 may, again, be implemented via XOR-tables that XOR two nibbles. This defines a computation of any output byte $z_{l,j}$ 405 in an AES-round as a network of lookup tables, which is the goal for the first step.

Figure 5:
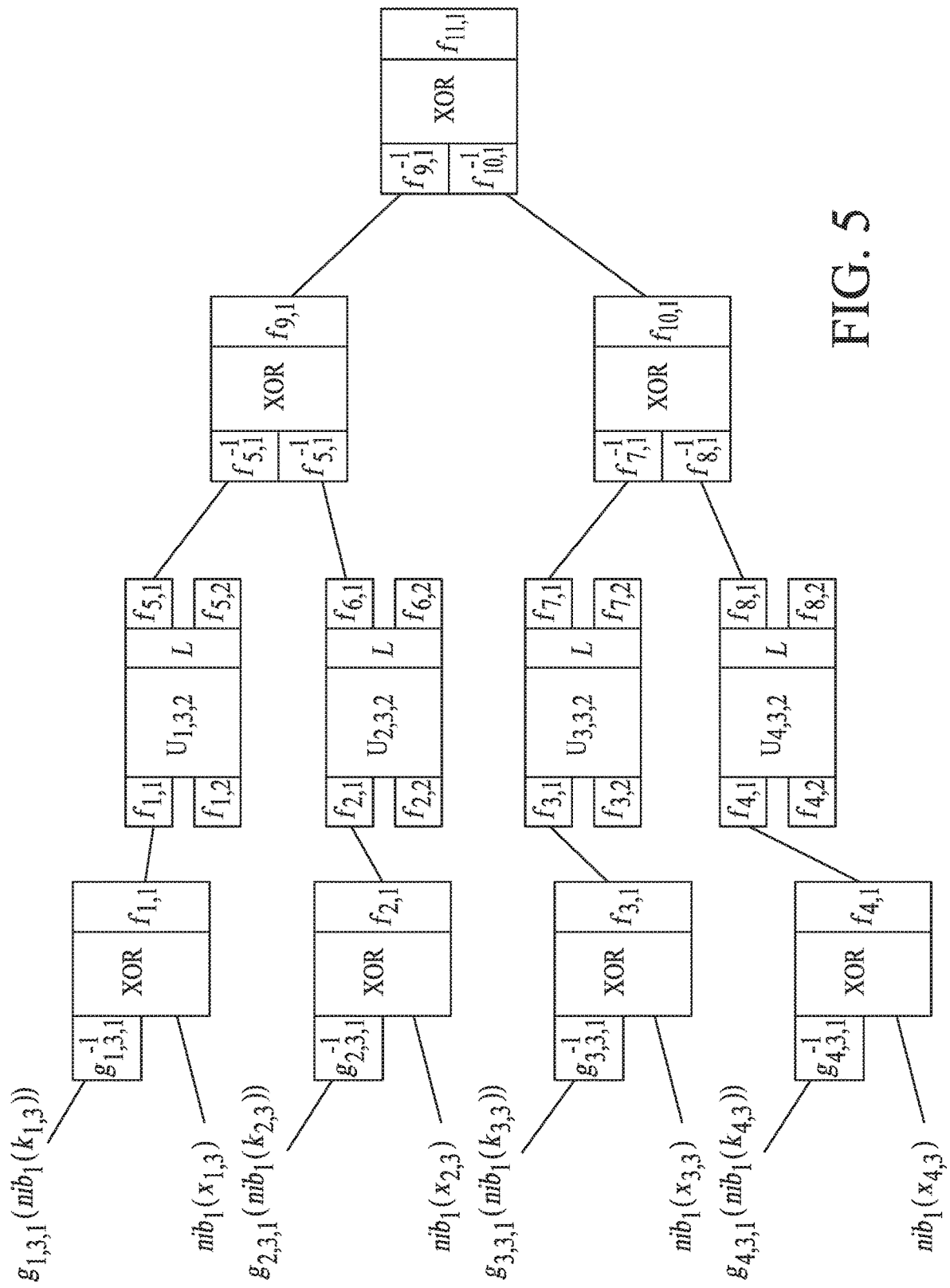
FIGS. 5 and 6 illustrates the application of encoding to the various steps of FIG. 4 wherein the calculations are split into two nibbles to perform the calculations.
Figure 6:
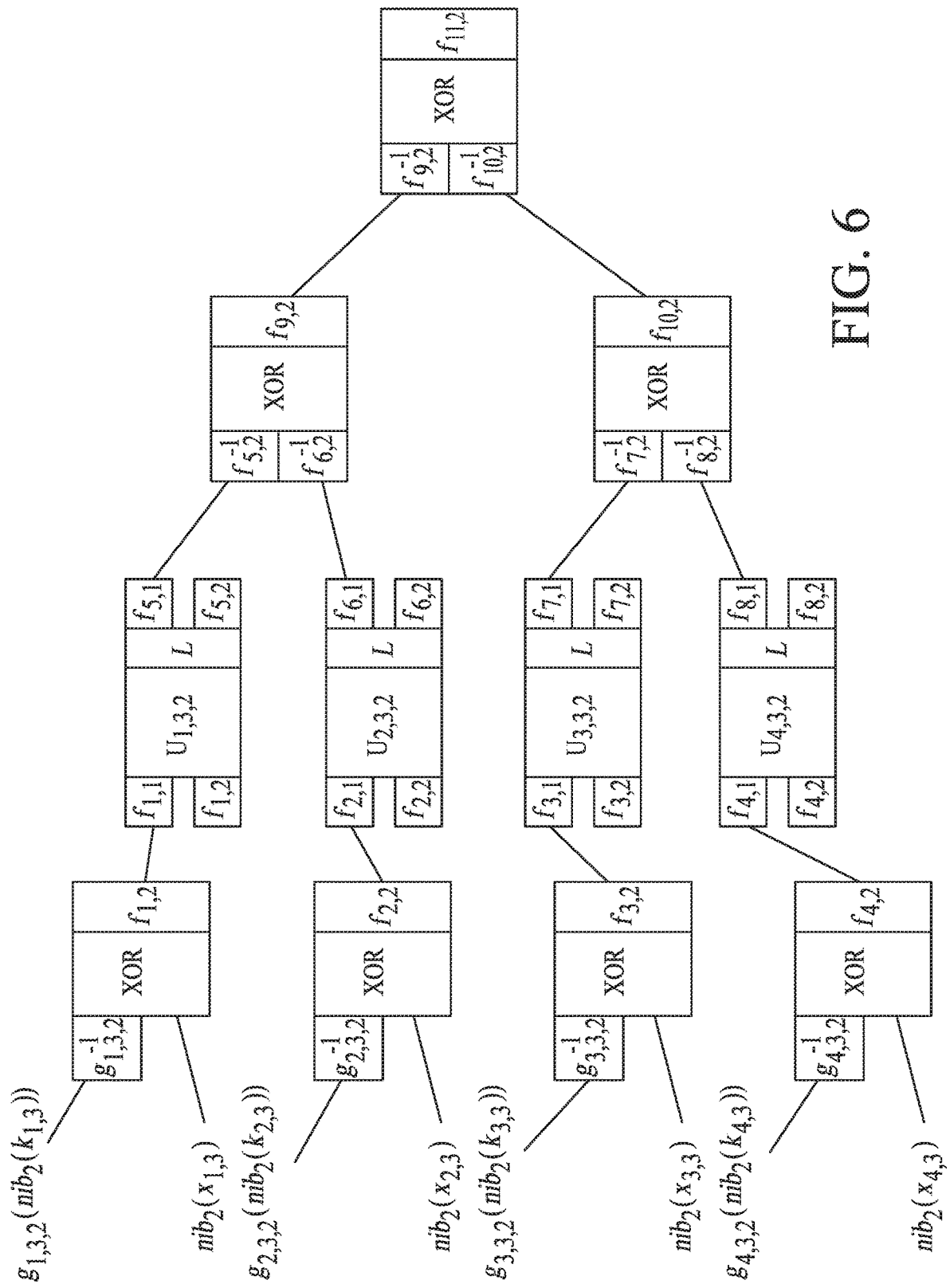

In the implementation depicted in FIG. 4, the key k is not yet hidden. Let $nib_i(b)$ be nibble i of a byte b. The key bytes may be encoded by randomly selected bijective nibble functions. That is, the two nibbles of key byte $k_{i,j}$ are encoded as $g_{i,j,1}(nib_1(k_{i,j}))$ and $g_{i,j,2}(nib_2(k_{i,j}))$, respectively, for randomly selected bijective functions $g_{i,j,1}$ and $g_{i,j,2}$. The inverse of these encodings are merged with the XOR-tables for which these nibbles are given as input. This is depicted in FIGS. 5 and 6. A similar method is applied to all nibbles in the network, except for those in the input plaintext and the output cipher text. That is, any internal nibble is encoded by a randomly selected bijective function, where the encoding step is merged with the lookup table generating the nibble and the decoding step is merged with the lookup table(s) consuming the nibble. The reason to not apply the method to the plaintext and ciphertext is to keep the functionality intact, i.e., to stay compliant with AES.

In addition to these nibble encodings, linear encodings may also be applied to the U-tables. The output of an 8-to-8-bit lookup table $U_{i,j,l}$ is encoded by an 8-bit linear mapping L. This encoding is chosen the same for all U-tables. The linear encoding L is removed in the next round by merging the next round's U-table with the linear mapping $L^{-1}$ that decodes its input.

An embodiment of how to build a white-box version of the leakage-resilient PRF depicted in FIG. 1 is now described. That is, we show how this PRF may be implemented such that it becomes resistant to the white-box DCA attack. Experiments show that to break the white-box implementation discussed above by DCA, 16 traces are needed. So, using the white-box implementation directly as PRF does not give us a DCA resistant solution.

Let $e_j$ be the 128-bit unit vector with a 1 at position j and a 0 at all other positions, where counting is started at position 1. Then define $P_i=\{0, e_1\}$ for all i=1,2, . . . ,128. The embodiment may be implemented by removing in the U-tables of the first round of any white-box implementation $WB_i$ all entries, except for:

the entries associated with input byte value 0 and 1 for the U-table related to the first input byte; and the entry associated with input byte value 0 for all other U-tables.

Then the attacker can only use the white-box to perform an encryption for 0 and $e_1$ and for no other input.

Instead of removing almost all entries in the U-tables, which implies that for inputs different from 0 and $e_1$ we cannot run the white-box implementation, these entries can also be set to an incorrect value. In that case, the white-box implementations for different inputs can be obtained, but it produces false results. Computational traces associated with these false results will only add noise to the DCA attack.

In FIG. 1, the key for $WB_1$ is the main key, and the key of $WB_{i+1}$ is given by the output of $WB_i$. In the white-box implementation described above, the key is encoded by arbitrary nibble encodings. For the main key, this is not a problem. The main key may be simply stored via its 11 round keys that are all encrypted. Now consider any next white-box implementation.

A first option is the following. If the white-box implementation $WB_i$ has no external output encoding, then the output may simply be used as input to the key scheduling algorithm. This gives 11 non-encoded round keys. If the encodings on the key bytes in $WB_{i+1}$ are omitted, this results in an implementation of FIG. 1.

A second, and more robust option, is to have an external encoding on the key computed by $WB_i$.

If the AES key-scheduling algorithm is also implemented using a white-box implementation in a similar way as the AES white-box implementation in the example above, then this encoding can be compensated for by merging the decoding operation with the first tables of the white-box key scheduling algorithm. If the white-box key scheduling algorithm is also provided with an external output encoding that is given by nibble-wise bijective functions, this results in an input as expected in the white-box implementation described in FIGS. 5 and 6.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for implementing a pseudo-random function (PRF) using a white-box implementation of a cryptographic function in N rounds, comprising:
   receiving an input to the PRF;
   receiving a cryptographic key in a first round of the N rounds;
   encrypting, using the white-box implementation of the cryptographic function and the cryptographic key, an input message that is one of M possible input messages based upon a portion of the input to produce a first output, wherein M is less than that total possible number of input messages;
   for each of the succeeding N−1 rounds:
      encrypting, using true white-box implementation of the cryptographic function and an $i^{th}$ cryptographic key, further input messages that are one of M possible input messages based upon a further portion of the input to produce an $i^{th}$ output, wherein the $i^{th}$ cryptographic key is the output from the preceding round,
   wherein the white-box implementation of the cryptographic function only produces a correct output for the M possible input messages and produces an incorrect output for input messages that are not one of the M possible input messages.

2. The method of claim 1, wherein the cryptographic function is AES.

3. The method of claim 1, wherein the white-box implementation of the cryptographic function uses substitution boxes (S-boxes) and wherein entries of the S-boxes associated with input messages that are not one of the M possible input messages are replaced with an incorrect value.

4. The method of claim 1, wherein the incorrect output of the white-box implementation of the cryptographic function is no output for input messages that are not one of the M possible input messages.

5. The method of claim 4, wherein the white-box implementation of the cryptographic function uses substitution boxes (S-boxes) and wherein entries of the S-boxes associated with input messages that are not one of the M possible input messages are removed from the S-box.

6. A non-transitory machine-readable storage medium encoded with instructions implementing a pseudo-random function (PRF) using a white-box implementation of a cryptographic function in N rounds, comprising:
   instructions for receiving an input to the PRF;
   instructions for receiving a cryptographic key in a first round of the N rounds;
   instructions for encrypting, using the white-box implementation of the cryptographic function and the cryptographic key, an input message that is one of M possible input messages based upon a portion of the input to produce a first output, wherein M is less than that total possible number of input messages;
   for each of the succeeding N−1 rounds:
      instructions for encrypting, using the white-box implementation of the cryptographic function and an $i^{th}$ cryptographic key, further in messages that are one of M possible input messages based upon a further portion of the input to produce an $i^{th}$ output, wherein the $i^{th}$ cryptographic key is the output from the preceding round,
   wherein the white-box implementation of the cryptographic function only produces a correct output for the M possible input messages and produces an incorrect output for input messages that are not one of the M possible input messages.

7. The non-transitory machine-readable storage medium claim 6, wherein the cryptographic function is AES.

8. The non-transitory machine-readable storage medium claim 6, wherein the white-box implementation of the cryptographic function uses substitution boxes (S-boxes) and wherein entries of the S-boxes associated with input messages that are not one of the M possible input messages are replaced with an incorrect value.

9. The non-transitory machine-readable storage medium claim 6, wherein the incorrect output of the white-box implementation of the cryptographic function is no output for input messages that are not one of the M possible input messages.

10. The non-transitory machine-readable storage medium claim 9, wherein the white-box implementation of the cryptographic function uses substitution boxes (S-boxes) and wherein entries of the S-boxes associated with input messages that are not one of the M possible input messages are removed from the S-box.

11. A pseudo-random function (PRF) device using a white-box implementation of a cryptographic function in N rounds, comprising:
   a memory; and
   a processor in communication with the memory, the processor configured to:
      receive an input to the PRF;
      receive a cryptographic key in a first round of the N rounds;
      encrypt, using the white-box implementation of the cryptographic function and the cryptographic key, an input message that is one of M possible input messages based upon a portion of the input to produce a first output, wherein M is less than that total possible number of input messages;
      for each of the succeeding N−1 rounds:
         encrypt using the white-box implementation of the cryptographic function and an $i^{th}$ cryptographic key, further input messages that are one of M possible input messages based upon a further portion of the input to produce an $i^{th}$ output, wherein the $i^{th}$ cryptographic key is the output from the preceding round,
      wherein the white-box implementation of the cryptographic function only produces a correct output for the M possible input messages and produces an incorrect output for input messages that are not one of the M possible input messages.

12. The device of claim 11, wherein the cryptographic function is AES.

13. The device of claim 11, wherein the white-box implementation of the cryptographic function uses substitution boxes (S-boxes) and wherein entries of the S-boxes associated with input messages that are not one of the M possible input messages are replaced with an incorrect value.

14. The device of claim 11, wherein the incorrect output of the white-box implementation of the cryptographic function is no output for input messages that are not one of the M possible input messages.

15. The device of claim 14, wherein the white-box implementation of the cryptographic function uses substitution boxes (S-boxes) and wherein entries of the S-boxes associated with input messages that are not one of the M possible input messages are removed from the S-box.

\* \* \* \* \*